(No Model.)
J. F. WARNER & F. COOK.
HAY STACKER.
No. 336,771. Patented Feb. 23, 1886.
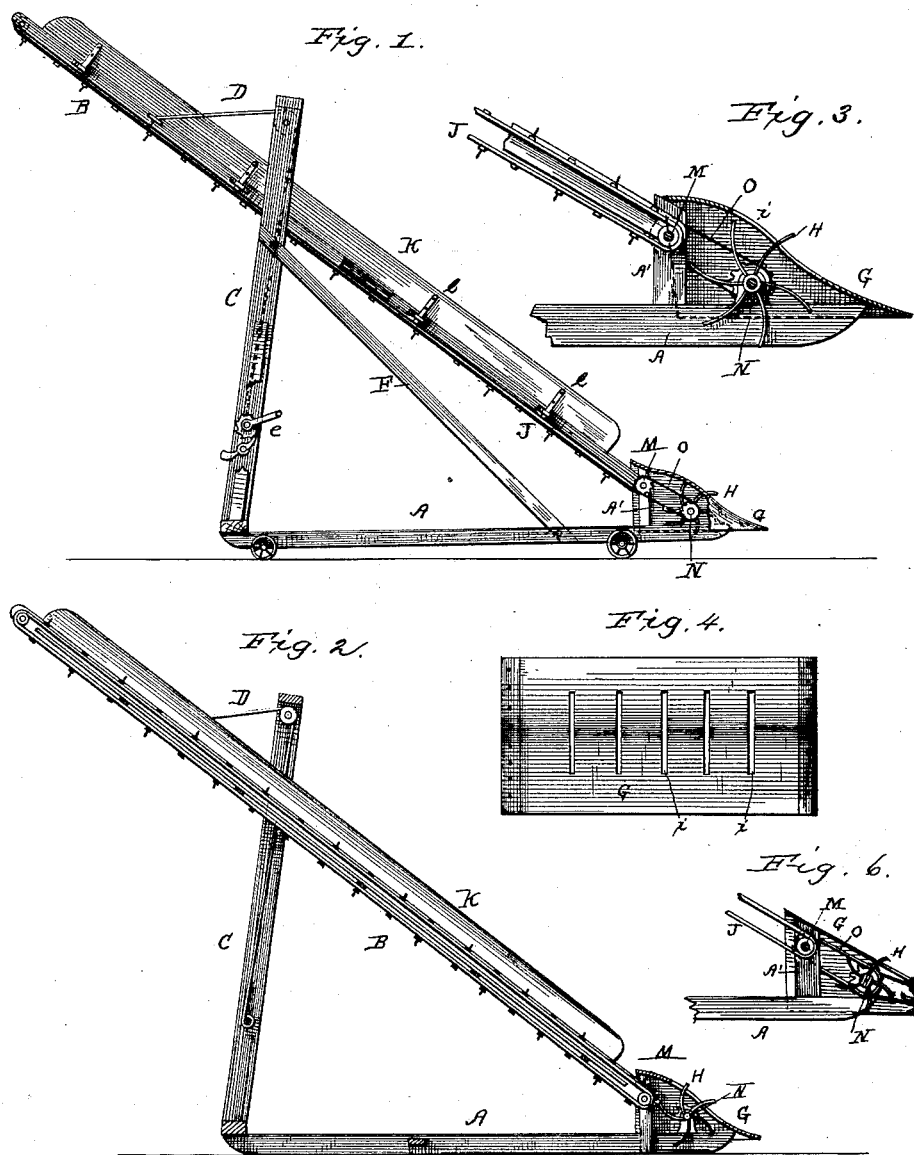
WITNESSES
INVENTORS

UNITED STATES PATENT OFFICE.

JOHN F. WARNER AND FREDERICK COOK, OF TAYLORVILLE, ILLINOIS.

HAY-STACKER.

SPECIFICATION forming part of Letters Patent No. 336,771, dated February 23, 1886.

Application filed August 18, 1885. Serial No. 174,687. (No model.)

*To all whom it may concern:*

Be it known that we, JOHN F. WARNER and FREDERICK COOK, citizens of the United States, residing at Taylorville, in the county of Christian and State of Illinois, have invented certain new and useful Improvements in Hay-Stackers, of which the following is a specification, reference being had therein to the accompanying drawings.

Our invention relates to machines for stacking hay and straw, its object being to convey the material from the ground and dump it upon the stack being constructed.

In the drawings, Figures 1 and 2 represent side elevations of the machine; Fig. 3, a detail longitudinal section of the front or snout of the machine; Fig. 4, a plan view of the hood; Fig. 5, a cross-section of the carrier-frame and carrier; and Fig. 6, a detail view of the feeder, at the front of the machine, as constructed with two toothed shafts.

The platform or base A may have its longitudinal timbers formed to act as sled-runners, as is evident from Fig. 2; or it may be mounted on wheels, as in Fig. 1. The base A is provided near the front end, on each side, with a short standard, A', and supports at its rear end an upright frame, C, braced by the strip F. The frame B, for the carrier-belt J, is hinged at one end to the standards A', and at the other is supported and adjusted to any height by the cords D, which pass over pulleys at the upper end of the said frame C, and thence downward to a windlass, e, journaled in the said frame C. The frame B is provided at each side with a board, K, having cleats l, which fit into staples upon the sides of the said frame B.

Journaled in the standards A' is a shaft, M, around which passes the lower end of the carrier-belt J, or, more properly, forms the lower support for the said belt. Parallel with the shaft M is a shaft, N, carrying tangs H, which, when the machine is in operation, pass or project successively through the slots $i$ in the inclined metallic gathering-hood G, the latter having a nose which engages under the hay. The said hood covers the mechanism to a point over the lower end of the said carrier-belt. The shafts M and N are provided with sprocket-wheels connected by a chain, O, so that the two move simultaneously.

In Fig. 6 an additional shaft, N', is shown, carrying tangs of less length than those on the shaft N, and is connected to the said shaft N by suitable sprocket-connection. The use of the two shafts allows the bringing of the front one nearer the ground. The tangs curve and move backward, and act to throw the hay or straw to the carrier J, from whence it is conveyed upward and deposited on the stack.

We claim—

1. A hay-stacker comprising a main frame, a carrier-frame pivoted thereto and having one end adjustable as to height, a slotted gathering-hood, and moving tangs projecting through said slots, said hood having a nose for engaging under the hay and carrying it to the tangs, substantially as specified.

2. In combination, a slotted gathering-hood, two parallel shafts under the same and carrying tangs which project through the slots, the tangs of the front shaft being of less length, and an elevating-carrier, substantially as specified.

In testimony whereof we affix our signatures in presence of two witnesses.

JOHN F. WARNER.
FREDERICK COOK.

Witnesses:
JOHN A. DENTON,
J. C. MCBRIDE.